United States Patent [19]
Christensen

[11] Patent Number: 5,097,891
[45] Date of Patent: Mar. 24, 1992

[54] PARALLEL CORE CHARGE AIR COOLER

[75] Inventor: Steven S. Christensen, Livermore, Calif.

[73] Assignee: Paccar Inc., Bellevue, Wash.

[21] Appl. No.: 593,072

[22] Filed: Oct. 5, 1990

[51] Int. Cl.$^5$ .................. F02B 29/04; F28D 1/04
[52] U.S. Cl. .................... 165/41; 165/44;
165/51; 123/563; 60/599
[58] Field of Search .............. 165/41, 44, 51;
123/563; 60/599

[56] References Cited

U.S. PATENT DOCUMENTS

| | | | |
|---|---|---|---|
| 2,164,628 | 7/1939 | Sibley | 165/83 |
| 2,308,119 | 1/1943 | Spieta | 165/83 |
| 3,203,499 | 8/1965 | Bartz et al. | 60/599 |
| 4,236,492 | 12/1980 | Tholen | 123/563 |
| 4,391,027 | 7/1983 | Fleury | 29/726 |
| 4,673,032 | 6/1987 | Hara et al. | 165/44 |
| 4,916,902 | 4/1990 | Pratt et al. | 165/51 |
| 4,953,631 | 9/1990 | Kimura | 165/51 |

FOREIGN PATENT DOCUMENTS

| | | | |
|---|---|---|---|
| 626130 | 12/1926 | France | 165/35 |
| 2273586 | 10/1986 | United Kingdom | 165/51 |

OTHER PUBLICATIONS

Agee, Keith, SAE Technical Paper "Influence of Vehicle Installation in Design of Chassis Mounted Coolers" Paper 851473, Aug. 4–8, 1985.

Primary Examiner—John Ford
Attorney, Agent, or Firm—Flehr, Hohbach, Test, Albritton & Herbert

[57] ABSTRACT

A charge air cooler apparatus for a truck having a front engine power takeoff mechanism. The charge air cooler has a first and a second core positioned in side-by-side spaced relation on opposite sides of the front engine power takeoff mechanism. Intake and outlet manifolds above and below the front engine power takeoff span the distance between the two cores, and turbocharged air preferably flows in parallel through the side-by-side cores. An auxiliary heat exchanger is shown mounted above the front engine power takeoff and between the cores.

15 Claims, 2 Drawing Sheets

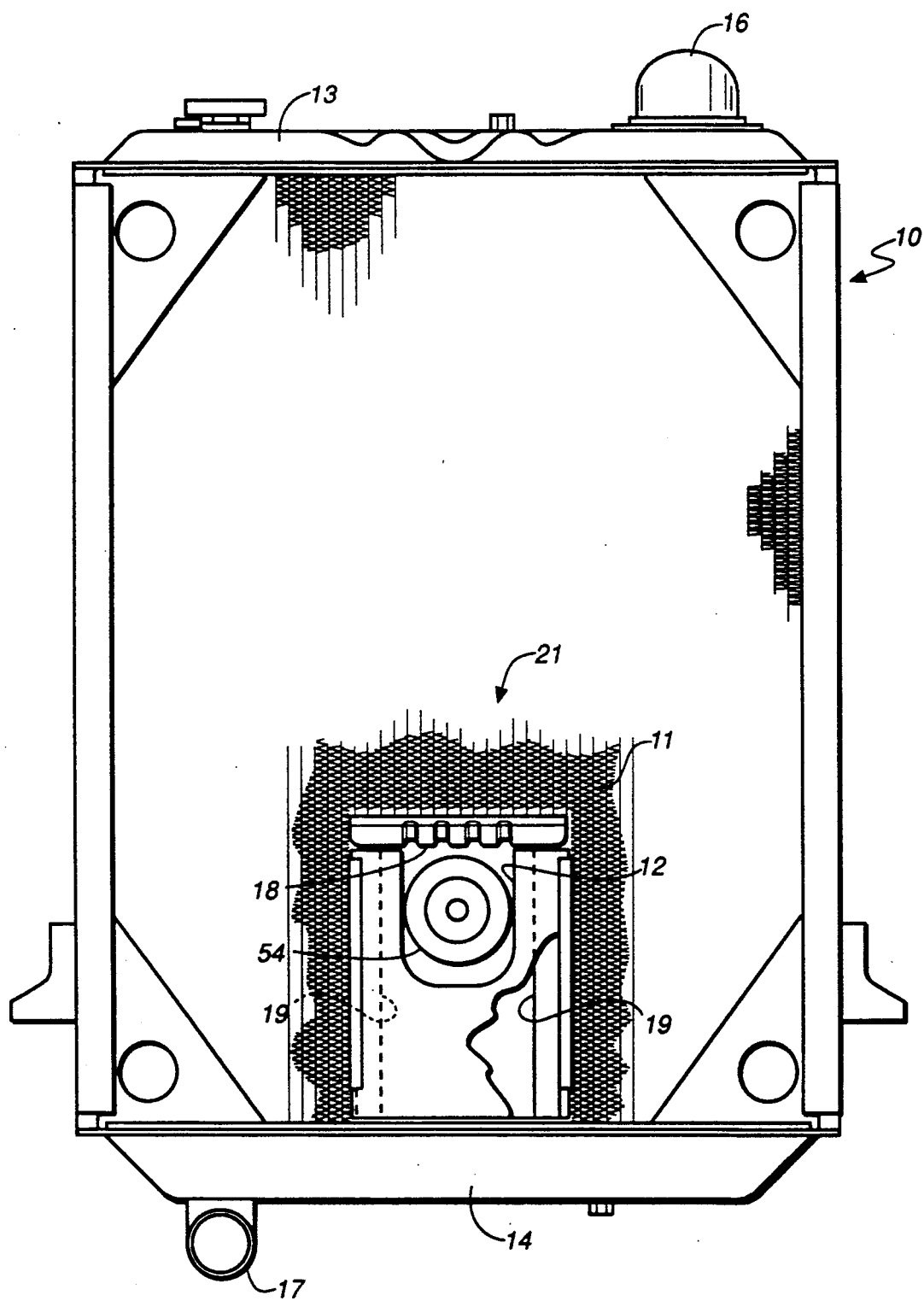
FIG._1

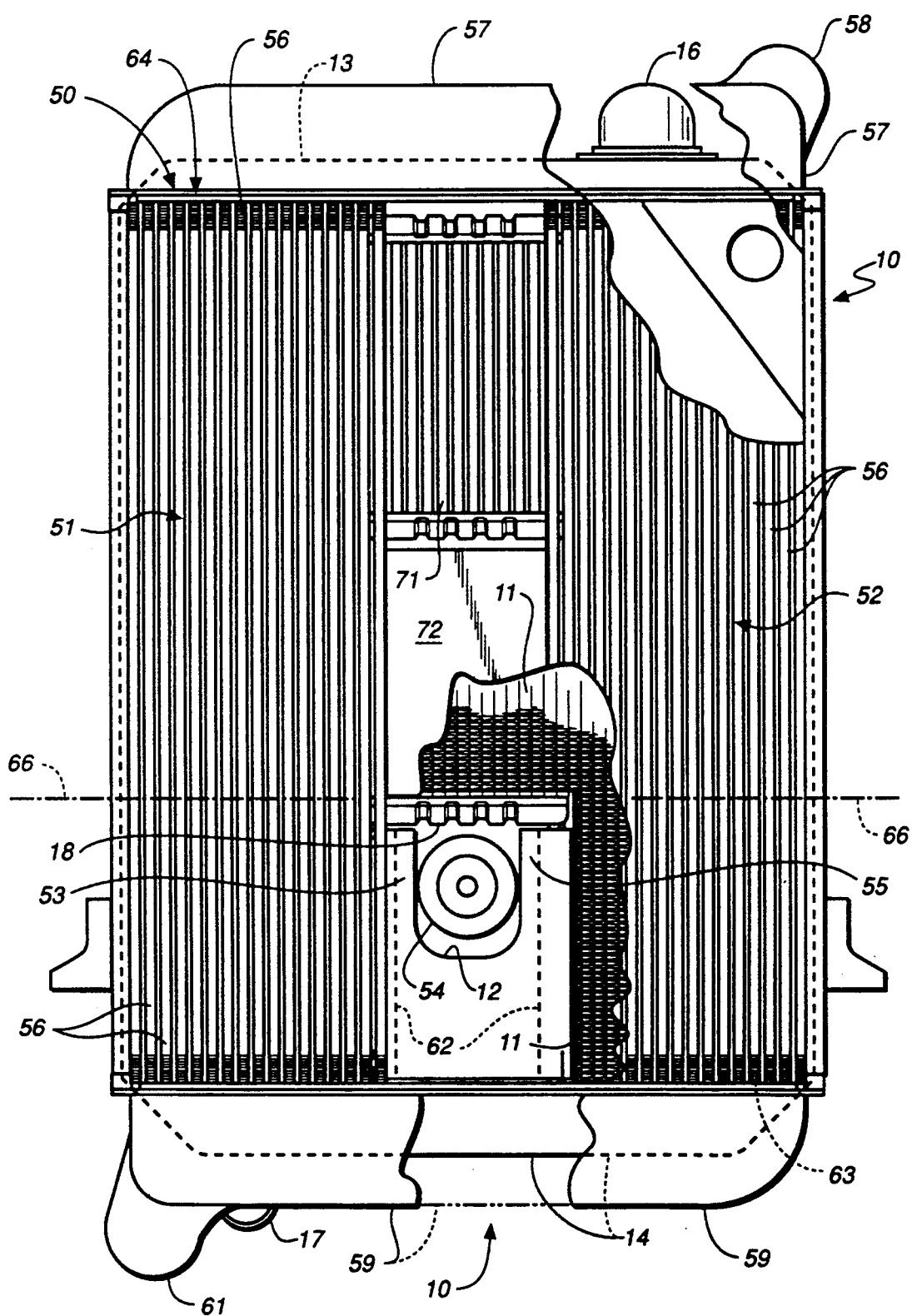
FIG._2

PARALLEL CORE CHARGE AIR COOLER

TECHNICAL FIELD

The present invention relates, in general, to heat exchangers such as radiators, charge air coolers and the like, for use in heavy vehicles, such as trucks, and more specifically, the invention relates to heat exchanger assemblies and charge air cooler assemblies which are used with trucks having front engine power takeoffs.

BACKGROUND ART

Some vehicles, and particularly trucks, employ a front engine power takeoff (FEPTO) to drive accessory components such as generators, snowplows, hydraulic lifts, cement mixers, hoists, drills, etc. Such FEPTO assemblies are usually coupled to the front end of the vehicle engine in a position which interferes with, or competes for space with, the vehicle radiator, and if the vehicle has one, the charge air cooler used to cool turbo-charged engine intake air. The conventional approach to this problem is to construct the radiator core with a notch or opening which receives the front engine power takeoff.

Radiator 10 is generally formed in a conventional manner and includes an upper manifold 13 and a lower manifold 14 each connected to core heat exchange tubes, usually finned, for the flow of a coolant, such as water or water and glycol, through core 11. Although the direction can be reversed, as shown in FIG. 1, coolant from the engine block enters manifold 13 at inlet 16 and exits outlet manifold 14 to return to the engine at outlet 17.

In order to accommodate the through-the-radiator FEPTO a midway manifold 18 is provided which is coupled by conduit 19 to outlet manifold 14. Thus, coolant entering tubes in a middle portion 21 of radiator 10 from inlet manifold 13 flows downwardly to midway manifold 18 and from the midway manifold down conduits 19 to outlet manifold 14 and back to the engine.

The use of a midway manifold to provide the necessary hole or opening in a heat exchanger having liquid-based coolant, is practical, but it does increase the cost of construction of the heat exchanger or radiator. The use of such a heat exchanger structure for heat exchangers employing a gas as the working fluid, such as charge air coolers, however, is not desirable.

Charge air coolers are heat exchangers in which the working fluid is air, namely, engine intake air which has been heated as a result of compression by a turbocharger. Many trucks employ a heat exchanger, charge air cooler, between the outlet of a turbocharger and the air intake of the engine in order to dissipate some of the heat generated during turbocharging or compressing of the air.

Such charge air coolers require substantial surface area to produce the desired temperature drop, and they must be operated on elevated pressure to maintain the benefits of turbocharging. Charge air coolers are usually mounted in front of a conventional water-based radiator, which means that the same problem of competition for frontal space between a charge air cooler and a FEPTO occurs.

Three general approaches in the provision of charge air coolers in vehicles having FEPTOS have been employed to accommodate the FEPTO. First, the charge air cooler can be mounted in cooling air in series in front or behind the radiator and have a construction as shown in FIG. 1. Second, the charge air cooler can be mounted in series with the radiator, but with the charge air cooler not extending below the midway manifold. Third, the charge air cooler can be mounted in parallel above or below the radiator, instead of in front of it. The last approach often is not practical because of limited front end space in many vehicles. The second approach can reduce the core volume, and particularly the length of the heat exchange tubes, sufficiently to prevent the necessary heat transfer to produce the desired intake air cooling.

The use of a heat exchanger having a structure as shown in FIG. 1 for a charge air cooler has several disadvantages. First, as is true for water-based radiators, a midway manifold and notched core inherently adds to the cost of the radiator. Moreover and more importantly, air under pressure is more difficult to contain than water. Under the thermal stresses which result from core tubes of different lengths and a midway manifold, the cost of manufacturing a reliable and durable charge air cooler having a FEPTO opening increases very dramatically. In practice such charge air coolers have not been found to reproducibly achieve the desired durability.

Accordingly, it is an object of the present invention to provide a durable and yet economical charge air cooler which can be mounted directly in front of the radiator assembly of a truck or the like and accommodate a front engine power takeoff.

It is another object of the present invention to provide a heat exchanger assembly for a vehicle, such as a truck, through which a front engine power takeoff drive mechanism can be routed.

It is still another object of the present invention to provide a charge air cooler which is constructed in a manner accommodating both a front engine power takeoff and another heat exchanger device mounted to receive cooling air in parallel to said charge air cooler.

Still a further object of the present invention is to provide a charge air cooler which is economical to construct, can be retrofit to a variety of vehicles, is adaptable to a variety of front engine power takeoff mechanisms, and minimizes thermal stresses.

The attainment of the foregoing and related objects, advantages and features of the invention should be more readily apparent to those skilled in the art, after review of the following Best Mode of Carrying Out the Invention, taken together with the drawings.

DISCLOSURE OF INVENTION

The charge air cooler or heat exchanger of the present invention is constructed in a manner which will enable it to be mounted in front of a vehicle engine having a front engine power takeoff mechanism coupled to the front of the engine. The charge air cooler of the present invention comprises, briefly, a first heat exchange core formed for mounting along one side of the power takeoff, a second core formed for mounting in spaced relation to the first core to extend along an opposite side of the front engine power takeoff, an input manifold and an outlet manifold coupled to both the cores for the flow of a fluid to be cooled, usually air, through both cores.

In the preferred form the two side-by-side spaced cores are joined together for parallel flow of the fluid to be cooled by the inlet and outlet manifolds. Most preferably, the inlet manifold and outlet manifold join the parallel cores together across the top and bottom of the heat exchanger assembly with a manifold above and below the front engine power takeoff. Optionally, an auxiliary or additional heat exchanger can be positioned between the spaced apart cores above the FEPTO.

BRIEF DESCRIPTION OF THE DRAWING

FIG. 1 is a front elevation view of a radiator of the prior art for use with a front engine power takeoff.

FIG. 2 is a front elevation view of a charge air cooler constructed in accordance with the present invention and mounted with an auxiliary heat exchanger in front of the radiator of FIG. 1.

BEST MODE OF CARRYING OUT THE INVENTION

The heat exchanger structure of the present invention is particularly well suited for use as a charge air cooler on trucks having both a turbocharged engine and a front engine power takeoff mechanism. Some of the advantages of the heat exchanger of the present invention, however, will accrue when the structure is incorporated into more conventional radiators, and it will be understood that internal combustion engine powered vehicles other than trucks having front engine power takeoffs advantageously can employ the heat exchange structure of the present invention.

In order to avoid the manufacturing costs and thermal stress which would result from constructing a charge air cooler as shown in FIG. 1, the charge air cooler of the present invention, generally designated 50, is formed with two, side-by-side and relatively spaced apart or separate core means or assemblies. As can be seen in FIG. 2 a first charge air cooling means 51 is formed for mounting to extend along one side 53 of a front engine power takeoff mechanism, generally designated 54. Mounted in spaced relation to first core means 51 is a second charge air cooling core means 52, which extends along an opposite side 55 of FEPTO 54. Core means 51 and 52 are conventional in their construction and each preferably include a plurality of side-by-side vertical tubes 56, which can include fins for increased heat transfer.

Air flow through core means 51 and 52 is accomplished in the illustrated charge air cooler by providing an inlet manifold 57 having an inlet port 58 coupled to the turbocharger output conduit, not shown. Manifold 57 is coupled to both core assemblies 51 and 52 at the top ends of tubes 56 for air flow into the tubes. An outlet manifold 59 is coupled to both core assemblies 51 and 52 at the bottom ends of tubes 56 and communicates air to discharge port 61 for subsequent flow to the engine intake. As will be understood, the inlet and outlet manifolds could be reversed for the flow of turbocharged engine intake air from port 61 at the bottom of the array up to the top of cores 51 and 52 for discharge to the engine outport 58.

It also is possible to provide for series flow of air through cores 51 and 52. Thus, an inlet manifold could be well below FEPTO 54, at which point outlet manifold 59 joins the cores together. Similarly, inlet manifold 57 spans the space between cores 51 and 52 at the top end 64 of the charge air cooler assembly. Manifolds 57 and 59 are connected to the spaced apart cores in a manner which provides structural strength to the charge air cooler array without impeding access to passage 62.

Charge air cooler 50, therefore, can be constructed in a conventional manner only with two spaced apart cores which are coupled together by manifolds that span the spacing between cores. All tubes 56 can be the same length, and an intermediate manifold, such as manifold 18 and short tubes are eliminated. Note that in addition to the vertical cores 51 and 52, shown in FIG. 2, the core arrangement can also be horizontal (or at an angle). If the core was horizontal in the embodiment of FIG. 2, the lower portion would have a smaller surface area than the upper portion.

While heat transfer area between and above FEPTO 54 is lost to charge air cooler 50, the amount of lost area is usually less than one-half that which connected only to core means 51 and an intermediate or transverse manifold used to couple core means 51 to core means 52 at the bottom of tubes 56 for the flow of air from core 51 to core 52. An outlet manifold would be coupled to only the top of core 52. Air would enter core 51 at the top end, proceed down core 51 and discharge from core 51 into transverse bottom manifold, proceed up core 52 and finally discharge from the top into an outlet manifold.

Of more importance than whether or not cores 51 and 52 are coupled in parallel or in series is that they are relatively spaced apart to define an access passageway 62 therebetween over a common height at least equal to the height of FEPTO 54. As can be seen from FIG. 2, FEPTO 54 usually is not located at the bottom end 63 of the heat exchanger assembly. Instead, cores 51 and 52 extend along sides 53 and 55 of the front engine power takeoff mechanism 54 to a position would be lost if manifold 59 were moved to plane 66, i.e., at a position above FEPTO 54. Moreover, as illustrated in FIG. 2 and set forth below, the area above FEPTO 54 and between cores 51 and 52 can advantageously be filled with auxiliary heat exchanger 71.

Referring again to FIG. 2, parallel core charge air cooler 50 provides for both adequate air cooling and substantial durability. Charge air cooler 50 also provides space for an additional or auxiliary heat exchange device 71.

In the configuration illustrated in FIG. 2 there is a gap between the parallel cores 51 and 52 and the top of FEPTO 54. Left open this gap would create an area through which input air would pass instead of going through the parallel cores 51 and 52. Therefore, a device can be inserted into this gap to enhance the flow of cooling air into the parallel cores 51 and 52. There are several ways of accomplishing this objective. A first is to provide an input air block panel 72 in all or a part of this area. An alternate more productive approach is to install an additional or auxiliary heat exchanger 71 in this gap. Possible auxiliary heat exchangers include, but are not limited to: a freon condenser, power steering fluid cooler, transmission fluid cooler, axle fluid cooler, hydraulic oil cooler, etc. The attachment of heat exchanger 71, and the necessary connecting tubes, is well known in the art.

Thus, parallel core charge air cooler 50 of FIG. 2, not only produces sufficient charge air cooling, but can be mounted in front of a conventional radiator 10, accommodates front engine power takeoff 54 and permits installation of an auxiliary cooling device 71. In so doing, a very efficient and durable radiator/charge air cooler/auxiliary cooling device with FEPTO clearance is derived. It is also possible to provide a spacer between the charge air cooler and radiator, with access means therein, for cleaning and servicing the charge air cooler 50 and radiator 10 without removing them from the truck.

The foregoing descriptions of specific embodiments of the present invention have been presented for purposes of illustration and description. They are not intended to be exhaustive or to limit the invention to the precise forms disclosed, and obviously modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A charge air cooler apparatus for mounting on a vehicle having a front engine power takeoff mechanism comprising:
   a first core means having a length and formed for mounting to extend along one side of said front engine power takeoff mechanism;
   a distinct second core means mounted in spaced relation to said first core means and having a length substantially equal to said length of said first core means to extend along an opposite side of said front engine power takeoff mechanism;
   input manifold means and output manifold means coupled to said first core means and said second core means for air flow into and out of both said first core means and said second core means; and
   said first core means and said second core means being laterally spaced apart from one another by a distance providing access to said front engine power takeoff mechanism between said first core means and said second core means, and said input manifold and said output manifold being laterally spaced from one another by a distance providing access to said front engine power takeoff mechanism.

2. The charge air cooler apparatus as defined in claim 1 wherein,
   said inlet manifold means and said outlet manifold means are coupled in parallel to said first core means and said second core means for the parallel flow of air in the two core means.

3. The charge air cooler apparatus as defined in claim 1 wherein,
   said first core means and said second core means are oriented to extend vertically along sides of said front engine power takeoff mechanism are spaced apart over substantially their entire lengths by a distance at least about equal to the width dimension of said front engine power takeoff mechanism; and
   said first core means and said second core means include a plurality of core tubes of substantially equal length.

4. The charge air cooler apparatus as defined in claim 3 wherein,
   said inlet manifold means and said outlet manifold means extend horizontally and are positioned above and below said front engine power takeoff mechanism.

5. The charge air cooler apparatus as defined in claim 4 wherein,
   said outlet manifold means is positioned below and proximate said front engine power takeoff means.

6. The charge air cooler apparatus as defined in claim 1, and
   an auxiliary heat exchange means mounted between said first core means and said second core means.

7. The charge air cooler apparatus as defined in claim 1, and
   means located between said first core means and said second core means to deflect air flow to said first core means and said second core means.

8. In a heat exchanger assembly for mounting on a vehicle having a front engine power takeoff mechanism, said heat exchanger including core means formed for mounting proximate said front engine power takeoff mechanism with core portions positioned on and extending along opposite sides of said front engine power takeoff mechanism, the improvement in said heat exchanger comprising:
   said core portions being provided by two distinct core assemblies each having a plurality of core tubes therein with substantially all said core tubes in each core assembly having substantially the same length dimensions, said core assemblies being mounted in side-by-side spaced relation over substantially the entire lengths of said core tubes in said core assemblies, said core assemblies being spaced apart by a distance sufficient for access between said core assemblies to said front engine power takeoff mechanism.

9. The heat exchanger assembly as defined in claim 8 wherein,
   said core assemblies are coupled together by inlet manifold means for parallel flow of a fluid to be cooled into said core assemblies.

10. The heat exchanger assembly as defined in claim 9 wherein,
    said core assemblies are coupled together by outlet manifold means for parallel flow said fluid from said core assemblies, said outlet manifold means being mounted in spaced relation to said inlet manifold means.

11. The heat exchanger assembly as defined in claim 10 wherein,
    said inlet manifold means is mounted for positioning on a top side of said front engine power takeoff mechanism, and said outlet manifold means is mounted for positioning on a bottom side of said front engine power takeoff mechanism.

12. A charge air cooler and radiator assembly for a truck having front engine power takeoff, comprising:
    radiator means having a clearance opening therethrough for receiving said front engine power takeoff mechanism; and
    a first charge air cooling core means and a distinct second charge air cooling core means, each of said core means being mounted in front of said radiator means and each of said core means having substantially the same length dimension, said first charge air cooling core means being mounted in spaced relation from said second charge air cooling core means over the lengths thereof by a distance sufficiently large to define an access passageway to said front engine power takeoff mechanism therebetween.

13. The apparatus of claim 12, wherein,
    said first charge air cooling core means and said second charge air cooling core means are coupled by manifold means for the parallel flow of air to be cooled therethrough.

14. The apparatus of claim 12, and an auxiliary heat exchange means mounted in front of said radiator means and between said first charge air cooling core means and said second charge air cooling core means.

15. The apparatus as defined in claim 12, and a front engine power takeoff mechanism mounted in alignment with said clearance opening and in alignment with said access passageway.

* * * * *